US010780819B2

(12) United States Patent
Hellin_Navarro

(10) Patent No.: US 10,780,819 B2
(45) Date of Patent: Sep. 22, 2020

(54) VEHICLE WINGLET WITH SEQUENTIAL BLINKER

(71) Applicant: Ficosa North America Corporation, Madison Heights, MI (US)

(72) Inventor: Sergio Hellin_Navarro, Bloomfield, MI (US)

(73) Assignee: FICOSA NORTH AMERICA CORPORATION, Madison Heights, MI (US)

( * ) Notice: Subject to any disclaimer, the term of this patent is extended or adjusted under 35 U.S.C. 154(b) by 0 days.

(21) Appl. No.: 16/225,159

(22) Filed: Dec. 19, 2018

(65) Prior Publication Data

US 2020/0198530 A1   Jun. 25, 2020

(51) Int. Cl.
*B60Q 1/26* (2006.01)
*B60R 1/12* (2006.01)
*F21S 41/24* (2018.01)
*F21S 43/237* (2018.01)
*F21S 43/235* (2018.01)
*F21S 43/236* (2018.01)

(52) U.S. Cl.
CPC ......... *B60Q 1/2696* (2013.01); *B60Q 1/2665* (2013.01); *B60R 1/1207* (2013.01); *B60R 1/12* (2013.01); *F21S 41/24* (2018.01); *F21S 43/235* (2018.01); *F21S 43/236* (2018.01); *F21S 43/237* (2018.01)

(58) Field of Classification Search
CPC ...... B60Q 1/2665; B60Q 1/2696; B60Q 1/26; B60Q 3/258; B60R 1/1207; B60R 1/12; F21S 43/235; F21S 43/236; F21S 43/237; F21S 43/241; F21S 41/24; F21K 9/61
See application file for complete search history.

(56) References Cited

U.S. PATENT DOCUMENTS

| 6,152,590 A | * | 11/2000 | Furst .................... B60Q 1/2665 362/545 |
| 6,511,192 B1 | | 1/2003 | Henion et al. |
| 6,926,432 B2 | | 8/2005 | Rodriguez Barros et al. |
| 7,188,981 B2 | | 3/2007 | Rodriguez Barros et al. |
| 7,192,171 B2 | | 3/2007 | Rodriguez Barros et al. |
| 7,258,471 B2 | | 8/2007 | Rodriguez Barros et al. |

(Continued)

FOREIGN PATENT DOCUMENTS

DE   102007019688   * 10/2008 ............... B60Q 1/26
EP   1304260 A1   4/2003
(Continued)

*Primary Examiner* — Zheng Song
(74) *Attorney, Agent, or Firm* — Brooks Kushman P.C.

(57) ABSTRACT

A vehicle winglet (e.g., sideview mirror, camera or radar assembly, etc.) is provided with sequential illumination of light-emitting diodes (LEDs). A light guide is connected to and covers the LEDs. The light guide is made of a translucent material and is configured to guide light illuminated by the LEDs and transfer the light out of the light guide. The light guide includes a plurality of light guide towers extending therefrom. Each light guide tower is aligned with a respective one of the LEDs. In some embodiments, a plurality of collimators are provided, with each collimator aligned with a respective one of the LEDs and with a respective one of the light guide towers to redirect the light illuminated from the respective LED into the respective light guide tower.

7 Claims, 3 Drawing Sheets

(56) References Cited

U.S. PATENT DOCUMENTS

| | | | |
|---|---|---|---|
| 7,524,092 B2 | 4/2009 | Rodriguez Barros et al. | |
| 7,588,358 B1 | 9/2009 | Condon | |
| 7,670,039 B2 * | 3/2010 | Altonen | G02B 6/0001 |
| | | | 200/314 |
| 7,717,596 B1 | 5/2010 | Bell | |
| 8,491,170 B2 | 7/2013 | Rodriguez Barros | |
| 8,568,005 B2 | 10/2013 | Rodriguez Barros et al. | |
| 9,890,920 B2 * | 2/2018 | Kaneko | F21S 43/249 |
| 2003/0007362 A1 * | 1/2003 | Robison | B60Q 1/2665 |
| | | | 362/487 |
| 2004/0190303 A1 | 9/2004 | Mishimagi | |
| 2007/0290829 A1 * | 12/2007 | Geiger | B60Q 1/2665 |
| | | | 340/475 |
| 2011/0210842 A1 | 9/2011 | Mandagaran | |
| 2011/0235353 A1 * | 9/2011 | Fukasawa | B60Q 1/2665 |
| | | | 362/494 |
| 2012/0140517 A1 * | 6/2012 | Sakamoto | G02B 6/0036 |
| | | | 362/607 |
| 2013/0044497 A1 * | 2/2013 | Sakamoto | G02B 6/0008 |
| | | | 362/311.04 |
| 2013/0083552 A1 * | 4/2013 | Ruiz Ortega | B60Q 1/2607 |
| | | | 362/516 |
| 2014/0091915 A1 * | 4/2014 | Rodriguez Barros | B60R 1/082 |
| | | | 340/435 |
| 2014/0320823 A1 * | 10/2014 | Ammar | B60R 1/12 |
| | | | 353/13 |
| 2015/0258931 A1 | 9/2015 | Kim et al. | |
| 2016/0272116 A1 * | 9/2016 | Wu | B60Q 9/008 |
| 2017/0113603 A1 * | 4/2017 | Shin | B60Q 1/34 |
| 2017/0356616 A1 | 12/2017 | Schiccheri et al. | |
| 2018/0238510 A1 * | 8/2018 | Gloss | F21S 41/143 |

FOREIGN PATENT DOCUMENTS

| | | | | |
|---|---|---|---|---|
| JP | | 2013122872 A | 6/2013 | |
| WO | | 2007145286 A1 | 12/2007 | |
| WO | WO 2018162037 | * | 9/2018 | F21S 43/245 |

* cited by examiner

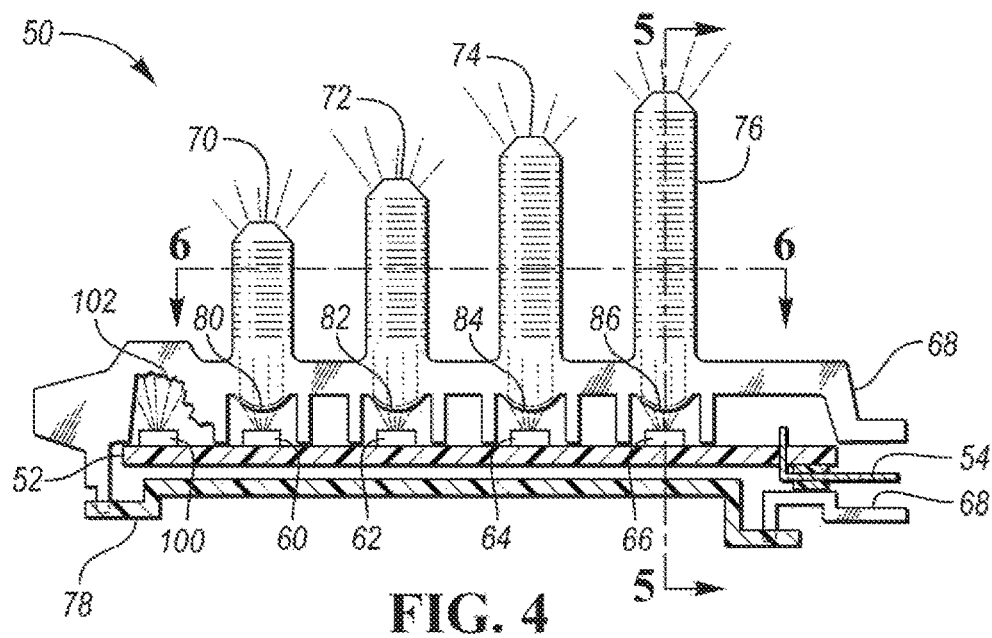
FIG. 4
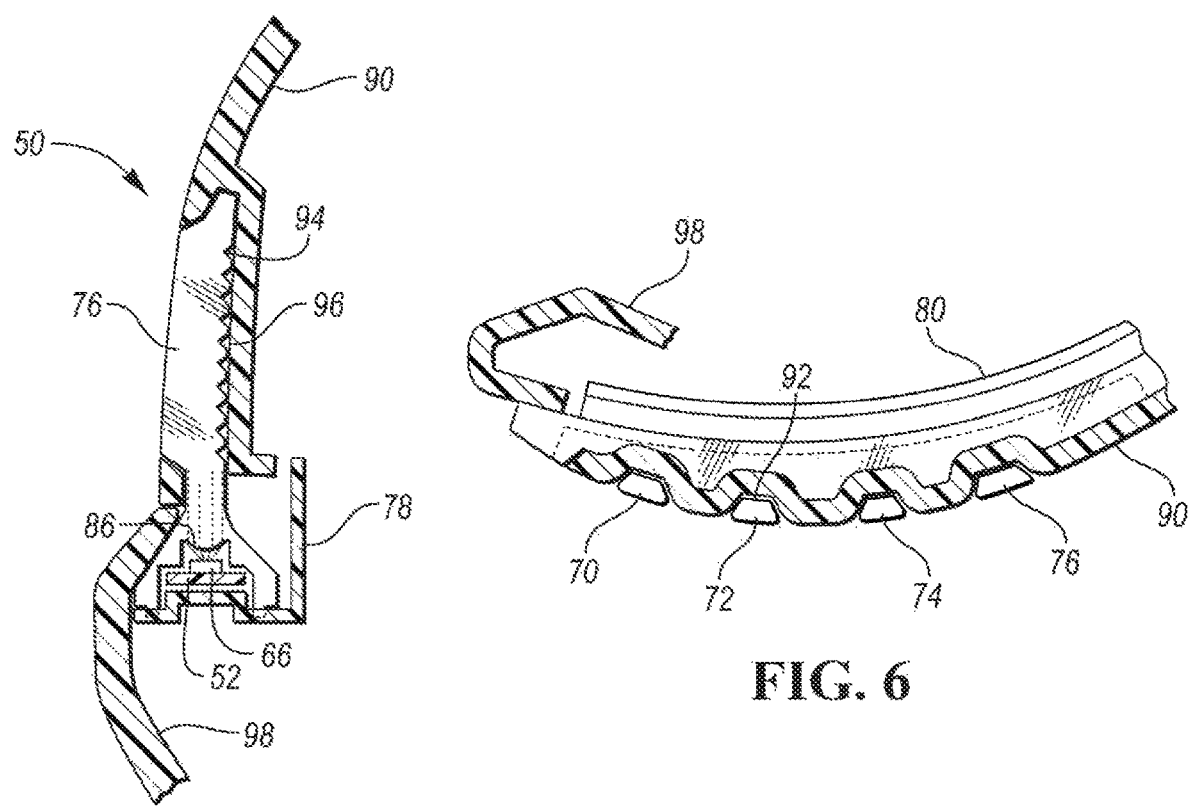
FIG. 5
FIG. 6

US 10,780,819 B2

VEHICLE WINGLET WITH SEQUENTIAL BLINKER

TECHNICAL FIELD

This disclosure is generally related to a vehicle winglet with a blinker that illuminates sequentially. In certain embodiments, this disclosure is more specifically related to an external sideview winglet with lights that illuminate sequentially in response to an action taken by the driver of the vehicle, such as activation of a turn signal.

BACKGROUND

Passenger vehicles, such as cars, trucks, etc., typically include winglets, such as side mirrors, sideview mirrors, external rearview mirrors, cameras or radars. Vehicle winglets are typically mounted outside the vehicle cabin to allow the driver to see the environment to the side of the vehicle. The winglets may be folded inward when, for example, the vehicle is parked so as to protect the winglets from accidental collision or impact from other vehicles passing by. This may be done by a motor housed within the winglet, for example.

It has been known to equip the winglets with a lighted turn signal that illuminates. For example, when the driver of the vehicle activates a turn signal indicator (such as a lever), a light within the winglet may correspondingly activate to indicate to other vehicles that the driver intends to turn or change directions. If the driver activates the turn signal indicator so as to indicate an intention to turn left or change direction toward the left, the turn signal within the left-side winglet may correspondingly illuminate. The right-side winglet may have a similar turn signal that illuminates in response to the driver activating the turn signal indicator so as to indicate an intention to turn right or change direction toward the right.

SUMMARY

In one embodiment, a vehicle winglet includes a printed circuit board (PCB) having a plurality of light-emitting diodes (LEDs) disposed thereon. A light guide is connected to and covers the LEDs. The light guide is made of a translucent material and is configured to guide light illuminated by the LEDs and transfer the light out of the light guide. The light guide includes a plurality of light guide towers extending therefrom, each light guide tower aligned with a respective one of the LEDs. In some embodiments, a plurality of collimators are provided, with each collimator aligned with a respective one of the LEDs. The collimators are configured to redirect light illumined from the respective one of the LEDs into a respective one of the light guide towers.

In another embodiment, a sequential blinker assembly for a vehicle winglet is provided. A cover is coupled to a printed circuit board (PCB). First and second light-emitting diodes (LEDs) are arranged along the PCB, the first and second LEDs configured to illuminate in a sequence. A light guide is coupled to the cover and covering the PCB. The light guide has a main body, a first light guide tower extending from the main body and aligned with the first LED, and a second light guide tower extending from the main body and aligned with the second LED. First and second collimators are provided, with the first collimator aligned with the first LED and configured to redirect light into the first light guide tower, and the second collimator aligned with the second LED and configured to redirect light into the second light guide tower.

In yet another embodiment, a system for sequentially illuminating regions of a vehicle winglet during a turn signal event is provided. A plurality of light-emitting diodes (LEDs) are configured to illuminate in sequence. A light guide extends over the LEDs, the light guide having a main body and a plurality of light guide towers extending therefrom, each light guide tower aligned with a respective one of the LEDs. A plurality of collimators are provided, with each configured to direct light from a respective one of the LEDs into a respective one of the light guide towers. An outer shell defining a plurality of pockets is configured to receive the light guide towers, wherein the outer shell separates the light guide towers.

BRIEF DESCRIPTION OF THE DRAWINGS

FIG. 4 is a front cross-sectional view of a sequential blinker assembly taken from a perspective of a front of the vehicle (i.e., the same perspective as FIGS. 1-3), with the skull cap removed for clarity, according to one embodiment.

FIG. 5 is a side cross-sectional view of the sequential blinker assembly taken along line 5-5 of FIG. 4, with the skull cap included, according to one embodiment.

FIG. 6 is a top cross-sectional view of the sequential blinker assembly taken along line 6-6 of FIG. 4, with the skull cap included, according to one embodiment.

DETAILED DESCRIPTION

Embodiments of the present disclosure are described herein. It is to be understood, however, that the disclosed embodiments are merely examples and other embodiments can take various and alternative forms. The Figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the Figures can be combined with features illustrated in one or more other Figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein (e.g., "upper," "lower," "inner," "outer," "top," "bottom," etc.) are intended to refer to the orientation of how the various components are illustrated in the Figures, and how the winglet disclosed herein is oriented relative to an upright vehicle. These terms are intended for contextual purposes.

This application is directed to a turn signal on a winglet of a vehicle. The vehicle winglet can include an external rearview mirror, a wing mirror, sideview mirror, camera, radar, lidar, or other such terms that refer to a winglet extending outside the vehicle cabin.

Modern vehicle winglets may be equipped with turn signals that can illuminate. This may be accomplished with a light source such as an incandescent bulb or a light emitting diode (LED). The light source may be placed directly in front of and aligned with a translucent portion of the winglet such that some or all of the light from the light source can pass directly from the light source through the translucent portion. The winglet may also be provided with light reflectors that reflect the light from the light source toward the translucent portion of the winglet. Sequential blinkers are also known in which LEDs are energized in a sequential manner in response to the turn signal switch being activated.

According to various embodiments described herein, a vehicle winglet is equipped with a sequential blinker provided with an array of light sources (e.g., LEDs) and corresponding light guides. In certain embodiments, each light guide is aligned with a respective one of the light sources, and also includes an optical prism or collimator to align the light from the light source for more effective light being shone through the winglet. The light sources may be arranged on a printed circuit board (PCB) that is connected (e.g., over-molded) with the light guides.

Figure 1:
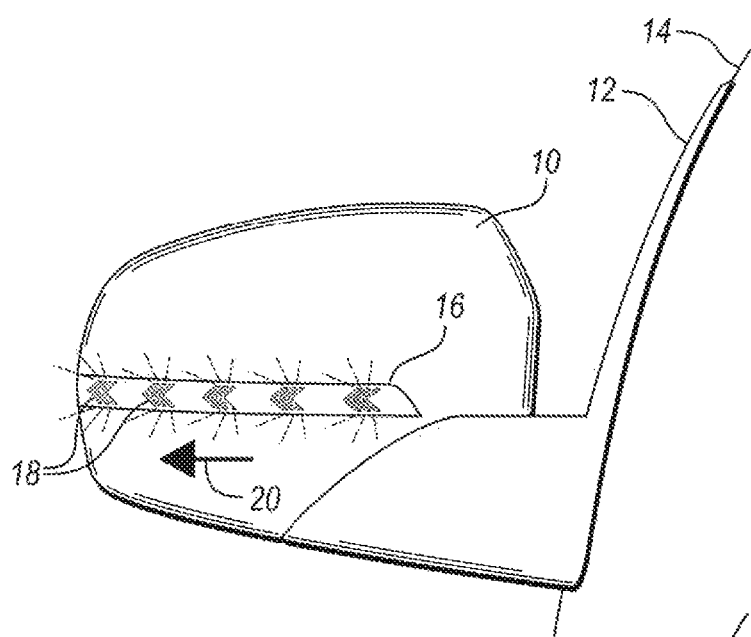
FIG. 1 is a front view of a vehicle winglet equipped with a sequential blinker, according to one embodiment.
Figure 2:
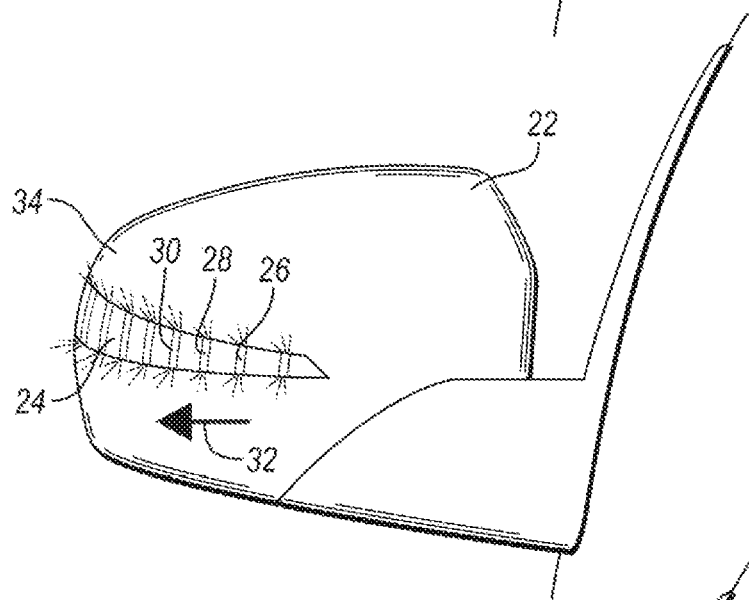
FIG. 2 is a front view of a vehicle winglet equipped with a sequential blinker, according to another embodiment.
Figure 3:
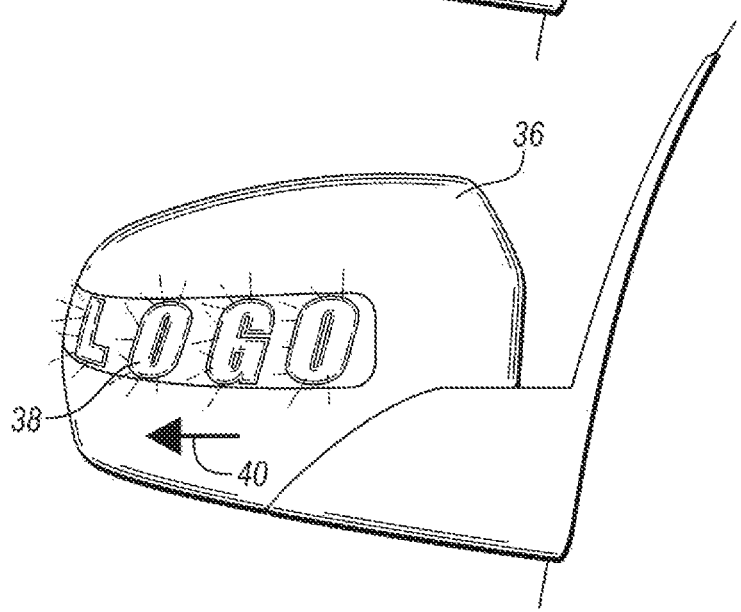
FIG. 3 is a front view of a vehicle winglet equipped with a sequential blinker, according to another embodiment.

FIGS. 1-3 show examples of sequential turn signals with sequential illumination that can be activated by the methods described herein. For example, FIG. 1 illustrates a winglet 10 configured to extend from an external side 12 of a vehicle 14. The winglet 10 includes a strip 16 with a plurality of designs, such as arrows 18 formed thereon. The arrows 18 may be etched or otherwise formed on the strip 16. The entire strip 16 may be translucent, such that some or all light can pass through. Alternatively, only the regions of the strip 16 where the arrows 18 are located may be translucent. In response to the driver activating the turn signal (in this case, the right turn signal), the arrows 18 illuminate in a sequential pattern, for example in the direction indicated by arrow 20. Once all of the arrows 18 are illuminated, at least some of the arrows 18 may be dimmed or darkened, until one-by-one the arrows 18 are again illuminated in the direction indicated by arrow 20.

FIG. 2 shows another example of sequential illumination of the winglet during a turn-signal event. In this embodiment, a winglet 22 is provided with a translucent region 24 which may be or include a lens cover. A plurality of illuminating bars 26, 28, 30, etc. may be provided that are illuminated in the direction of arrow 32 when activated. The bars may increase in size along the direction of arrow 32; bar 30 may be larger than bar 28, which may, in turn, be larger than bar 26. Thus, as the bars 26, 28, 30, etc. are illuminated, an increasing size of illuminated bars appears visible to outsiders.

Each bar 26, 28, 30, etc. may be a light guide such as those described below. The translucent region 24 may be optional, and instead the light guides 26, 28, 30, etc. may be interconnected with an exterior surface of a skull cap 34 of the winglet 22. As will be described, each light guide 26, 28, 30, etc. may be aligned with a respective light source (e.g., LED) located beneath a respective one of the light guides (i.e., below each bar with respect to the orientation shown in FIG. 2). Thus, as each light source is illuminated, light travels from that light source and up a respective one of the light guides 26, 28, 30, etc.

FIG. 3 is another example of sequential illumination of the winglet during a turn-signal event. Here, a winglet 36 includes a plurality of light guides 38 that collectively form a logo (such as one to identify the brand of the vehicle) when all light guides 38 are illuminated. Separate portions of the logo may be aligned with a respective one of the light sources; for example, using the design "LOGO" shown in FIG. 3, each of the letters "L", "O", "G", and "O" may be aligned with a respective light source (e.g., LED). As the light sources (e.g., LEDs) are activated in the direction of the arrow 40, the full design "LOGO" becomes illuminated.

In another example, the sequential illumination is made in multiple directions, such as from left to right, right to left, middle inside to outside, or combinations of the same. This may be a "welcome" feature when, for example, the driver locks or unlocks the vehicle, the vehicle senses the mobile device (e.g., cellular phone, key fob, wearable device such as a watch, etc.) entering within a certain range of the vehicle, the driver calling for an automatic start of the vehicle, etc. For example, in response to the driver pressing the unlock button on the mobile device, the lights on the winglet illuminate from left to right, and then right to left, and then all lights remain illuminated until the driver enters the vehicle and/or starts the engine. This disclosure is also not limited to only illuminating the lights in a linear fashion; the lights may also illuminate with a strobe light pattern, revolving light pattern, an alternating light pattern, a flashing light, a pulsating light, an oscillating light or any combination thereof. Additionally, references to "illuminating" herein can also mean modulating the power intensity of the lights to create a variable intensity light signal.

FIGS. 1-3 are merely examples of sequential illumination of light sources (e.g., LEDs) and light guides in a vehicle winglet. The remaining Figures illustrate various embodiments of structure configured to provide such sequential illumination. The structure described below can be configured to provide the sequential illumination shown in FIGS. 1-3, for example.

FIGS. 4-7 illustrate one example of a sequential blinker assembly 50 for implementation in any of the winglets described above. FIG. 4 shows a front cross-sectional view of the sequential blinker assembly 50 taken from a perspective of a front of the vehicle (i.e., the same perspective as FIGS. 1-3), with a skull cap 90 removed for clarity. FIG. 5 shows a side cross-sectional view of the sequential blinker assembly 50 taken along line 5-5 of FIG. 4, with the skull cap 90 included. FIG. 6 shows a top cross-sectional view of the sequential blinker assembly 50 taken along line 6-6 of FIG. 4, with the skull cap 90 included.

Referring to FIGS. 4-7, the sequential blinker assembly 50 includes a plurality of components assembled together, including a PCB with light sources, a light guide, a cover, electrical connects, etc., that will be described below. In the illustrated embodiment, the sequential blinker assembly 50 includes a PCB 52 powered by an external power source (not shown) via an electrical connector 54, such as an electrically-conductive pathway like a copper wire, coupled to the PCB 52.

The PCB 52 supports and delivers power to a plurality of light sources. The light sources can include LEDs 60, 62, 64, and 66. Each LED 60-66 may be arranged linearly along the PCB 52. Spaced above the PCB 52 is a light guide 68. The light guide 68 is configured to transmit the light emitting from the LEDs with high light transmissivity and low light loss.

The light guide 68 may be a molded, single-piece component made of a plastic, such as acrylic or polycarbonate for example. The light guide 68 can have a plurality of light guide towers, such as light guide tower 70, 72, 74, 76. When assembled, each light guide tower is aligned vertically with a respective one of the LEDs. For example, light guide tower 70 is aligned with LED 60, light guide tower 72 is aligned with LED 62, light guide tower 74 is aligned with LED 64, and light guide tower 76 is aligned with LED 66. The light guide towers 70-76 may extend vertically away from the main body of the light guide 68, and may be horizontally separated from one another by air, the skull cap 90 (described below), or other structure to give the appearance of a separate illuminated bar or strip as each LED is illuminated.

The light guide 68 may be connected to a cover 78. The cover 78 may support the PCB 52 from beneath, or may be spaced vertically from the PCB 52. The light guide 68 can be connected to the cover 78 in multiple locations by a snap-fit or via fasteners during assembly. The cover 78 may also extend beneath the light guide 68 and wrap around the rear of the light guide 68, as shown in FIG. 5. The cover 78 may be made of any suitable material configured for lightweight support (e.g., plastic), and may be indirectly or directly mounted to other parts of the winglet for proper fixation of the sequential blinker assembly 50.

As mentioned above, each light guide tower 70-76 is aligned vertically with a respective one of the LEDs 60-66. Thus, when each of the LEDs 60-66 are individually illuminated during operation of the sequential blinker (e.g., from left to right in FIG. 4), light is correspondingly guided through each respective light guide tower 70-76 sequentially. These light guide towers 70-76 are visible from the outside of the vehicle, and provide the appearance of a sequential blinker (such as shown in FIGS. 1-3) as the light guide towers 70-76 are sequentially illuminated. The light guide towers 70-76 may also be covered and aligned with a translucent strip (such as those described above with reference to FIGS. 1-3) such that illumination of each light guide tower 70-76 illuminates a respective pattern, such as an arrow, a letter, a portion of a logo, the "welcome" feature described above, etc.

The light guide 68 may also be provided with collimators to help guide the light. For example, the light guide 68 may have a plurality of collimators 80, 82, 84, 86 each aligned with a respective one of the light guide towers 70, 72, 74, 76. Also, each collimator 80-86 can be integrally formed during the molding process of the light guide 68. The collimators 80-86 are convex lens-shaped features that can narrow the light emitted from each of the LEDs 60-66, causing the direction of motion of the light from each LED to be more parallel as the light moves toward the light guide towers 70-76. As each LED 60-66 is illuminated, the light hits a respective collimator 80-86 to travel vertically into a respective light guide tower 70-76. With the help of the collimators 80-86, the sequential blinker assembly 50 has a designated light guide tower 70-76 for each LED 60-66 as the LEDs are illumined sequentially.

Vehicle winglets, or side mirrors, can also include a skull cap, known in the art. Skull caps typically are the outer-most shell or housing component of a winglet. Skull caps typically cover an upper portion of the winglet, and fasten to another shell component either beneath the skull cap or on the side of the vehicle.

FIGS. 5 and 6 show one embodiment of the skull cap 90 for attachment to the sequential blinker assembly 50. The skull cap 90 can be formed to include a plurality of indentations or pockets 92. Each pocket 92 is sized and configured to receive a respective one of the light guide towers 70-76. As shown in the view of FIG. 6, this can create an undulating or serpentine shape of the skull cap 90 with intermittent locations of light guide towers 70-76.

The skull cap 90 may contact and partially surround the rear, unexposed side of the light guide towers 70-76. Each of the light guide towers 70-76 may include surface features to engage the skull cap 90. For example, referring to FIG. 5, the light guide tower 76 includes a rear surface 94 that includes corrugated or ribbed surface features. This can facilitate a connection to a front surface 96 of the skull cap 90. An adhesive may be provided in the area between the rear surface 94 of the light guide tower 76 and the front surface 96 of the skull cap 90.

The sequential blinker assembly 50 can also include a frame or housing 98. The housing 98 is located beneath the skull cap 90 and can fasten or otherwise secure to the skull cap 90. The housing 98 can also support and/or attach to the light guide towers 70-76 from beneath. The combination of the housing 98 and the skull cap 90 can encapsulate the sequential blinker within the winglet.

Referring back to FIG. 4, the sequential blinker assembly 50 can also include an additional light source or LED 100 positioned on the PCB 52. The additional LED 100 may not be aligned with a respective light guide tower 70-76, but may instead be aligned with an optics prism 102 formed by surface features on the light guide 68. The optics prism 102 may include a plurality of inclined, angled, or tapered surfaces that facilitate the distribution of light from the additional LED 100 in many multiple directions. This allows the light from the additional LED 100 to be sent through the light guide 68 at various angles, creating a full, consistent illumination of the entire light guide 68 when the additional LED 100 is activated. In other words, the optics prism 102 allows the activation of the additional LED 100 to illuminate a majority of the light guide 68, as opposed to the collimators 80-86 which specifically direct the light in a single direction (e.g., up the light guide towers 70-76). In one embodiment, the additional LED 100 is activated sequentially after all of the other LEDs 60-66 have been activated to create a more full, brighter light throughout the light guide 68. In another embodiment, the additional LED 100 is activated sequentially before any of the other LEDs 60-66 are activated to create a general full-body light in the light guide 68 before each light guide tower 70-76 is more brightly illuminated in sequence.

Figure 7:
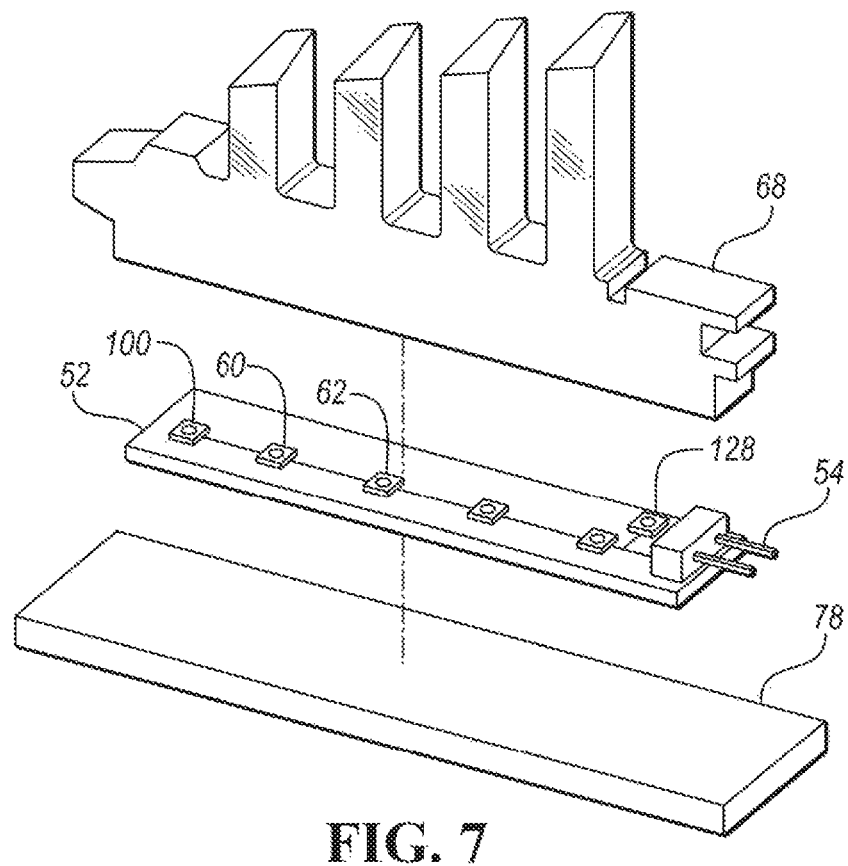
FIG. 7 is an exploded perspective view of the sequential blinker assembly of FIGS. 4-6, according to one embodiment.
Figure 8:
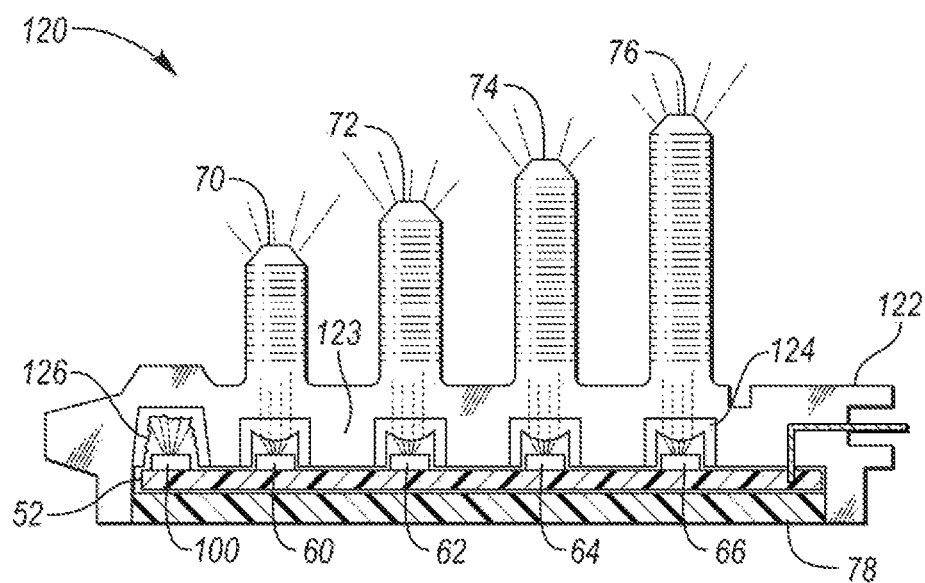
FIG. 8 is a front cross-sectional view of a sequential blinker assembly taken from a perspective of a front of the vehicle (i.e., the same perspective as FIGS. 1-3), with the skull cap removed for clarity, according to another embodiment.

FIG. 8 illustrates another example of a sequential blinker assembly 120. The sequential blinker assembly includes identical or similar structure as the embodiment of FIGS. 4-7 unless otherwise described below. The sequential blinker assembly 120 includes the LEDs 60-66 and the additional LED 100, along with light guide towers 70-76 as in the previous embodiment. In this embodiment, a light guide 122 is over-molded onto the cover 78. This provides a molded connection between the light guide 122 and the cover 78 that is made during formation of the light guide 122.

Also in this embodiment, the optics prism and one or more of the collimators are not formed as integral features of the light guide, but are rather separately connected. For example, one or more of the collimators, such as collimator 124, can be adhered, fastened, or otherwise secured within the light guide 122. The light guide 122 can also be over-molded onto one or more of the collimator 124. Likewise, an optics prism 126 can be adhered, fastened, or otherwise secured within the light guide 122. The light guide 122 can also be over-molded onto the optics prism 126. As can be seen in FIG. 8, the over-molded light guide 122 includes regions 123 that fill the space between each respective collimator 124. In contrast, the light guide 68 in the embodiment of FIG. 4 includes legs that extend downward on either side of each LED 60-66.

It should be understood that some of the features of the various embodiments disclosed above can be combined to form new embodiments of the sequential blinker assembly.

While not shown in the Figures, the LEDs may be selectively illuminated by commands sent from a controller. The controller may be on-board the PCB 52, such as controller 128 (such as shown in FIG. 7). Alternatively, the controller may be outside of the vehicle winglet and instead housed within the vehicle itself. The controller can be connected to other controllers in a hierarchy, such as an electronic control unit ("ECU"). The controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. Executable instructions may include, for example, activating the LEDs in sequence based on a signal indicating the turn signal within the vehicle cabin has been activated by the driver.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A sequential blinker assembly for a vehicle winglet, the sequential blinker assembly comprising:
    a cover;
    a printed circuit board (PCB) coupled to the cover;
    first and second light-emitting diodes (LEDs) arranged along the PCB, the first and second LEDs configured to illuminate in a sequence;
    a light guide coupled to the cover and covering the PCB, the light guide having a main body, a first light guide tower extending from the main body and aligned with the first LED, and a second light guide tower extending from the main body and aligned with the second LED;
    first and second collimators, the first collimator aligned with the first LED and configured to redirect light into the first light guide tower, and the second collimator aligned with the second LED and configured to redirect light into the second light guide tower;
    a third LED aligned with the light guide, wherein the light guide does not include a third light guide tower aligned with the third LED; and
    an optics prism aligned with the third LED to facilitate light emitted from the third LED to distribute through the light guide.

2. The sequential blinker assembly of claim 1, wherein the first and second collimators are formed as an integral part of the light guide.

3. The sequential blinker assembly of claim 1, wherein the light guide is over-molded onto the cover.

4. The sequential blinker assembly of claim 1, further comprising a skull cap coupled to the cover, the skull cap including a first pocket that receives the first light guide tower, and a second pocket that receives the second light guide tower, wherein the first and second light guide towers are separated from each other by the skull cap.

5. A system for sequentially illuminating regions of a vehicle winglet during a turn signal event, the system comprising:
    a plurality of light-emitting diodes (LEDs) configured to illuminate in sequence;
    a light guide extending over the LEDs, the light guide having a main body and a plurality of light guide towers extending therefrom, each light guide tower aligned with a respective one of the LEDs;
    a plurality of collimators, each configured to direct light from a respective one of the LEDs into a respective one of the light guide towers; and
    an outer shell defining a plurality of pockets configured to receive the light guide towers, wherein the outer shell separates the light guide towers,
    wherein the pockets collectively create a serpentine shape of the outer shell that holds the light guide towers in separation.

6. The system of claim 5, wherein each light guide tower includes a rear surface with ribbed surface features facing a front surface of the outer shell.

7. The system of claim 5, wherein the LEDs are aligned along a direction and wherein each light guide tower increases in height along the direction.

* * * * *